United States Patent

Barri

[11] Patent Number: 5,118,483
[45] Date of Patent: Jun. 2, 1992

[54] CRYSTALLINE (METALLO) SILICATES AND GERMANATES-SUZ-4

[75] Inventor: Sami I. Barri, South Ascot, England

[73] Assignee: The British Petroleum Company p.l.c., London, England

[21] Appl. No.: 768,452

[22] Filed: Sep. 27, 1992

Related U.S. Application Data

[63] Continuation of Ser. No. 386,388, Jul. 27, 1989, abandoned.

[30] Foreign Application Priority Data

Aug. 3, 1988 [GB] United Kingdom ............... 8818452

[51] Int. Cl.$^5$ ............................................. C01B 33/34
[52] U.S. Cl. ................................... 423/328; 502/77; 208/46
[58] Field of Search ....................... 423/328, 329, 330; 502/77; 208/46

[56] References Cited

U.S. PATENT DOCUMENTS

| | | | |
|---|---|---|---|
| 2,950,952 | 8/1960 | Breck et al. | 423/329 |
| 3,308,069 | 3/1967 | Wadfinger | 423/328 |
| 3,972,983 | 8/1976 | Ciric | 423/328 |
| 4,372,930 | 2/1983 | Short et al. | 423/326 |
| 4,400,328 | 8/1983 | Takegami et al. | 423/328 |
| 4,452,907 | 6/1984 | Ball et al. | 423/328 |
| 4,508,837 | 4/1985 | Zones | 502/62 |
| 4,510,256 | 4/1985 | Zones | 502/62 |
| 4,522,800 | 6/1985 | Balteo et al. | 423/328 |
| 4,837,000 | 6/1989 | Takatsu et al. | 423/328 |

FOREIGN PATENT DOCUMENTS

| | | | |
|---|---|---|---|
| 12572 | 6/1980 | European Pat. Off. | |
| 55046 | 6/1982 | European Pat. Off. | |
| 0074651 | 3/1983 | European Pat. Off. | 423/328 |
| 90149 | 10/1983 | European Pat. Off. | |
| 184409 | 6/1986 | European Pat. Off. | |
| 187522 | 7/1986 | European Pat. Off. | |
| 213739 | 3/1987 | European Pat. Off. | |

*Primary Examiner*—R. Bruce Breneman
*Attorney, Agent, or Firm*—Larry W. Evans; Joseph G. Curatolo; Sue E. Phillips

[57] ABSTRACT

A crystalline material having, in the dehydrated form the empirical formula:

$$m(M_{2/a}O): X_zO_{xz/2}: yYO_2 \qquad (I)$$

in which m is 0.5 to 1.5; M is a cation of valency a; X is a metal of valency x, selected from aluminium, boron, gallium zinc, iron and titanium; z is 2 when x is an odd number, an z is 1 when x is an even number; y is at least 5; and Y is silicon or germanium; and having, in the calcined hydrogen form, an X-ray diffraction pattern including significant peaks substantially as shown in table I herein. The material has been designated SUZ-4.

20 Claims, No Drawings

CRYSTALLINE (METALLO) SILICATES AND GERMANATES-SUZ-4

This is a continuation of co-pending application Ser. No. 07/386,388 filed on Jul. 27, 1989 now abandoned.

The present invention relates to novel crystalline silicates, germanates, metallosilicates and metallogermanates, and to a process for their preparation.

The present invention provides a crystalline material having, in the dehydrated form, the empirical formula:

$$m(M_{2/a}O): X_zO_{xz/2} \cdot yYO_2 \qquad (I)$$

in which m is 0.5 to 1.5; M is a cation of valency a; X is a metal of valency x, selected from aluminum, boron, gallium, zinc, iron and titanium; z is 2 when x is an odd number, and z is 1 when x is an even number; y is at least 5; and Y is silicon or germanium; and having, in the calcined hydrogen form, an X-ray diffraction pattern including significant peaks substantially as shown in Table I herein.

The material according to the invention is referred to herein as SUZ-4. The material can be regarded as a metallosilicate or metallogermanate, or as a silicate or germanate when y is very high.

Preferably X is gallium or, especially, aluminium. Preferably Y is silicon. The material may contain two or more different metals X, and/or both silicon and germanium. When X is aluminium and Y is silicon, the material is an aluminosilicate, or zeolite.

As is common in this field, it should be understood that in addition to the elements represented in the general formula I, the material may be hydrated by water in addition to any present when M is hydrogen. The material may also include occluded or adsorbed materials such as alcohols or nitrogenous materials originally present in the synthesis mixture or resulting from reaction of materials originally present. Further, the material may contain more cations M than necessary to balance the charge associated with metal X. This phenomenon is described, for example, in J. Chem. Soc. Chem. Commun., 1985, pp. 289-290. All such materials should be understood to be within the scope of the invention.

The cation M may for example be selected from H⁺, ammonium, alkali metal cations, alkaline earth metal cations, organic nitrogen containing cations, aluminium cations, gallium cations and mixtures thereof. The cations M present in the material as initially prepared will of course depend on the substances present in the synthesis gel. Commonly, an alkali metal, especially sodium and/or potassium, will be present, possibly along with cations of organic nitrogen-containing materials. Those cations initially present may if desired be replaced either wholly or partially by other cations e.g. hydrogen ions or metal cations using conventional ion exchange techniques. The hydrogen form (i.e. $M=H^+$) may be produced by known methods such as acid exchange or ammonium exchange followed by a thermal treatment, or a combination of the two. For many applications, it may be useful to produce SUZ-4 in the calcined hydrogen form.

Occluded or adsorbed materials may if desired be removed by thermal and/or chemical techniques.

As stated above, material SUZ-4 may be prepared by reacting together under aqueous alkaline conditions the following materials: a source of oxide $YO_2$; water; and tetraethylammonium hydroxide or halide or its precursor or reaction product; plus if desired, a source of oxide $X_zO_{xz/2}$ and a source of $M(OH)_a$; the reaction mixture having components in the following molar ratios: $YO_2/X_zO_{xz/2}$=at least 5, especially 5 to 80, most preferably 10 to 30; $H_2O/YO_2$=4 to 500, especially 5 to 200, most preferably 7 to 100; $OH^-/H_2O$=less than 0.04, especially less than 0.02, most preferably $10^{-4}$ to 0.02; tetraethylammonium compound/$YO_2$=0.005 to 2.0 especially 0.01 to 1.0, most preferably 0.02 to 0.5; the reaction conditions being selected and maintained such as to produce crystals of SUZ-4. $OH^-$ should be understood to be defined as follows:

$$a[(\text{no. of moles of } M(OH)_a)-(\text{no. of moles of } M(OH)_a \text{ associated with } X_zO_{xz/2})]$$

It should be understood that even if no source of oxide $X_zO_{xz/2}$ or source of $M(OH)_a$ is deliberately added to the reaction mixture, the resulting material will inevitably contain small amounts of element X or metal cations M, particularly aluminium and sodium, present as impurities in the reactants or as contaminants of the equipment used.

Following synthesis, it is possible to adjust the value of y by conventional chemical techniques. For example, y may be increased by treatment with acid, silicon tetrachloride, ammonium hexafluorosilicate or a combination of steaming and ammonium ion exchange. All these treatments tend to remove element X from the framework. y may be reduced by treatment with, for example, sodium aluminate, gallate, zincate or titanate, or similar treatments which introduce X into the framework.

The source of oxide $YO_2$ may for example be sodium silicate, silicic acid, precipitated silica, colloidal silica, or the germanium equivalent.

The source of oxide $X_zO_{xz/2}$, if used, may be an aluminium salt, aluminium hydroxide, aluminium oxide, or a metal aluminate; or the equivalent for other metals X. The use of a metal aluminate, especially sodium aluminate, is preferred.

The source of $M(OH)_a$ may for example be an alkali or alkaline earth metal hydroxide, for example sodium, potassium, magnesium or calcium hydroxide. A mixture of different materials, for example sodium hydroxide plus potassium hydroxide, may be used.

The reaction mixture may also if desired contain an alcohol, for example methanol. Methanol has in some cases been found to be beneficial in the synthesis of SUZ-4. If alcohol is present, then the molar ratio is preferably alcohol/$YO_2$=up to 200, especially up to 100, most preferably up to 50.

The process for the preparation of material SUZ-4 requires the presence of tetraethylammonium hydroxide or halide or its precursor or reaction product as a template. If desired, certain other nitrogenous materials may also be present in the reaction mixture.

The reaction mixture is maintained under crystallisation conditions until crystals of the desired product SUZ-4 are formed. In general, a reaction temperature of from 100° to 250° C. under autogenous pressure is suitable, and an optimum reaction time can be determined by monitoring the course of the reaction.

It has been found that the material SUZ-4 as prepared may contain relatively large amounts of material may occluded with its pores. Materials which may be present may include methanol and tetraethylammonium hydroxide, or reaction products thereof.

As is common in zeolite synthesis the precise way in which the reation is carried out will affect the end product. Particular combinations of parameters may be used to optimise the yield of SUZ-4. Such optimisation is a routine part of zeolite synthesis. The novel product SUZ-4 may under some circumstances be co-produced with other crystalline materials. It is for example often produced in admixture with mordenite. The alkalinity of the reaction mixture may be a particularly important parameter; for a mixture having a fixed Si/Al ratio, a higher alkalinity appears to lead to a product having a lower Si/Al ratio. The Si/Al ratio of the product will in any event be lower than or equal to the Si/Al ratio of the reaction mixture. Particular reaction conditions which lead to the production of SUZ-4 are given in the Examples herein.

Material SUZ-4 has a variety of potential applications particularly as a catalyst or adsorbent. As is common in the field of zeolites and zeolite-type materials, it may be used in a number of purifications or separations, and a number of catalytic conversions, for example the conversion of hydrocarbons and oxygenates into other products. In addition to its intrinsic activity conferred by its porous crystalline structure, it may also be subjected to exchange or impregnation with an element suitable for imparting a specific type of catalytic activity. Metal or non-metal compounds which may be used for ion-exchange and/or impregnation may for example be compounds of any one of the following elements, namely those belonging to Groups IB, IIA, IIB, IIIA, IIIB, IVA, IVB, VA, VIB, VIIB and VIII according to the Periodic Table due to Mendeleef. Specifically, compounds of copper, silver, zinc, aluminium, gallium, indium, thallium, lead, antimony, bismuth, chromium, molybdenum, tungsten, manganese, iron, cobalt, nickel, ruthenium, rhodium, palladium, iridium, platinum, rhenium and phosphorus are preferred.

Throughout this Specification, it should be understood that reference to an X-ray diffraction pattern indicates a powder diffraction pattern obtained on a conventional fixed-slit X-ray diffractometer using copper K-alpha radiation. Table I gives the positions of significant peaks present in the XRD of fully calcined SUZ-4 in the hydrogen form. It should be understood that the complete XRD's may contain peaks in addition to those listed in the Table. In addition, where peaks are close together, two or more peaks may, through lack of resolution, appear as a single peak. In particular, of the peaks in Table I, those at 3.58 and 3.55 may appear as a single peak, and those at 3.49 and 3.48 may appear as a single peak, that is, those peaks at 3.55 and 3.48 may appear to be absent. XRD's are of course obtained from experimental samples. Where a material is produced in admixture with another material, unknown peaks resulting from the first material may be hidden underneath peaks at the same position attributable to the second material. It will also be understood that the intensities of the peaks can vary widely depending on a number of factors, notably the presence of non-framework materials. The presence of water, alcohol or nitrogenous materials present in or resulting from the original synthesis gel, may alter the relative intensities of the peaks at different d-spacings. Other factors which can affect the details of the XRD include the molar ratio of X to Y and the particle size and morphology of the sample. It will be appreciated that the XRD patterns presented in the Examples hereinafter are those actually obtained from various samples of calcined and uncalcined SUZ-4.

Data were collected on a Philips PW 1050 goniometer fitted with a fixed divergence slit ($\frac{1}{4}$ degree) in the incident beam and a graphite monochromator in the diffracted beam. Theta is the Bragg angle; I is the intensity of a peak; and $I_o$ is the intensity of the strongest peak. Philips APD 1700 processing software was used to determine d-spacings (in angstrom units) and relative intensities ($100 \times I/I_o$) with copper radiation, copper K-alpha one wavelength = 1.54056 Angstroms.

The following Examples illustrate the invention. In the Examples, the following reagents were used:

Sodium aluminate: ex. BDH technical containing 40 wt % $Al_2O_3$, 30 wt % $Na_2O$ and 30 wt % $H_2O$
Potassium hydroxide: ex. FSA Laboratory Supplies
Distilled water
Quinuclidine ex Aldrich
Tetraethylammonium hydroxide solution: ex Fluka AG 40 wt % in water
Ludox AS40 (Trade Mark): ex DuPont containing 40 wt % silica in water
Methanol: ex BDH Analar
Aluminium tri-isopropoxide (technical): ex BDH The quantities of reagents used in each Example are summarised in Table A.

EXAMPLE 1

8.0 g of sodium aluminate and 12.0 of potassium hydroxide were dissolved in 200 grams of distilled water. 10 g of quinuclidine and 30 g of tetraethylammonium hydroxide solution (40 wt % in water) were added to the solution and stirring was carried out for approximately five minutes. 100 g of Ludox AS40 (Trade Mark) was added with stirring. The formed hydrogel was stirred in order to ensure homogenous mixture. The hydrogel had a molar composition of:

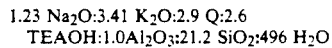

1.23 $Na_2O$:3.41 $K_2O$:2.9 Q:2.6
TEAOH:1.0$Al_2O_3$:21.2 $SiO_2$:496 $H_2O$ where
Q = quinuclidine
TEAOH = tetraethylammonium hydroxide The hydrogel was divided into four portions and loaded into approximately 150 cm³ pressure vessels. The vessels were heated at 180° C. while revolving. The pressure vessels were then cooled after periods of 17, 24, 40 and 48 hours. The solid products were washed and dried at 100° C. All the dried products were shown by X-ray powder diffraction analysis to be pure SUZ-4. The X-ray powder diffraction pattern of the dried product of the 17-hour heating period was as shown in Table 1. This sample was also shown by X-ray fluorescence spectroscopy to have a Si/Al atomic ratio of 6.0.

EXAMPLE 1(b)

The SUZ-4 sample used in this example was that produced in Example 1(a) after 17 hours heating at 180° C. Approximately 5 grams of this product were placed as a shallow bed in a silica tray (dimensions 156×95×24 mm). The tray was placed in a muffle furnace and heated at 1° C./minute to 550° C. and held at this temperature for 24 hours. A nominal air flow of not less than 500 cm³/minute was passed through the furnace throughout.

The furnace was allowed to cool after the heating period and the sample was $NH_4^+$ exchanged twice at room temperature by stirring the zeolite in 250 grams of 1M $NH_4NO_3$ solution for 30 minutes.

The zeolite was then washed and dried and finally calcined at 550° C. as above, to produce the zeolite in its fully calcined hydrogen form. The powder pattern of the product was as shown in Table 1(b).

EXAMPLE 2

The procedure of Example 1 was essentially followed except that the reagents and weights used are those shown in Table A. The hydrogel had a molar composition of:

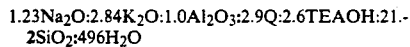

$1.23Na_2O:2.84K_2O:1.0Al_2O_3:2.9Q:2.6TEAOH:21.2SiO_2:496H_2O$

The hydrogel was heated at 180° C. for 7 days. The solid product after washing and drying was found by X-ray powder diffraction to be SUZ-4 with a minor amount of mordenite present. The XRD pattern was as shown in Table 2. The product was found by X-ray fluorescence spectroscopy to have a Si/Al atomic ratio of 7.3.

EXAMPLE 3(a)

2.0 grams of sodium aluminate and 2.5 grams of potassium hydroxide were dissolved in 50 grams of water. 2.5 grams of quinuclidine and 15 grams of tetraethylammonium hydroxide solution (40% wt in water) were added and the solution was stirred for ca. five minutes. 25 grams of Ludox AS40 (Trade Mark) was added to produce a hydrogel and stirring was continued to ensure a homogeneous mixture. The hydrogel had a molar composition of:

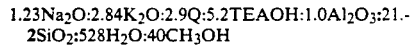

$1.23Na_2O:2.84K_2O:2.9Q:5.2TEAOH:1.0Al_2O_3:21.2SiO_2:528H_2O:40CH_3OH$

The hydrogel was loaded into a pressure vessel (approx. 150 cm³ capacity) and rotated at 180° C. for 5 days under the autogeneous pressure. At the end of this period the pressure vessel was cooled to ambient and the content was filtered. The solid product was washed with distilled water and dried at 100° C. The solid was examined by X-ray powder diffraction and found to contain SUZ-4 with a trace of mordenite. The XRD pattern of the product is given in Table 3(a). The product was analysed by X-ray fluorescence spectroscopy and found to have a Si/Al atomic ratio of 6.5.

EXAMPLE 3(b)

Approximately 5 grams of the product of Example 3(a) were placed as a shallow bed in a silica tray (dimensions 156×95×24 mm). The tray was placed in a muffle furnace and heated 1° C./minute to 550° C. and held at this temperature for 24 hours. A nominal air flow of not less than 500 cm³/minute was passed through the furnace throughout.

The furnace was allowed to cool to ambient and the calcined sample was examined by X-ray powder diffraction. The X-ray powder diffraction pattern was as shown in Table 3(b).

EXAMPLE 4

The procedure of Example 1 was essentially followed to make the hydrogel except that the reagents and weights used are those shown in Table A. The hydrogel had a molar composition of:

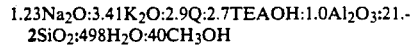

$1.23Na_2O:3.41K_2O:2.9Q:2.7TEAOH:1.0Al_2O_3:21.2SiO_2:498H_2O:40CH_3OH$

The hydrogel was heated at 180° C. for 5 days. The solid product after filtering, washing and drying was found by XRD to be a mixture of SUZ-4 and mordenite. The XRD pattern is shown in Table 4. The product was shown by X-ray fluorescence spectroscopy to have a Si/Al atomic ratio of 7.0.

EXAMPLE 5(a)

4.7 g of aluminium triisopropoxide and 3.9 g of potassium hydroxide were dissolved in 57.8 of distilled water. 7.7 g of tetraethylammonium hydroxide solution (40 wt % in water) was added to the solution and stirred for approximately 5 minutes. 26 g of Ludox AS40 was added with stirring in order to ensure that the formed hydrogel was homogenously mixed. The hydrogel had a molar composition of:

$3.0K_2O:1.8TEAOH:1.0Al_2O_3:15.0SiO_2:375H_2O$.

The hydrogel was loaded into approximately 150 cm³ pressure vessel and heated to 180° C. while revolving for 4 days. At the end of this period the pressure vessel was cooled to ambient and the content was filtered. The solid product was washed with distilled water, dried at 100° C. and examined by X-ray powder diffraction. The XRD pattern is given in Table 5(a). The product was a good sample of SUZ-4. The silica/alumina molar ratio of the product was found by X-ray fluorescence spectroscopy to be 12.5.

EXAMPLE 5(b)

10 g of the product of Example 5(a) was calcined in air at 550° C. for 16 hours and given 3 1-hour reflux treatments in 1 liter (1 mole/dm³) ammonium nitrate solution. The zeolite was filtered washed with distilled water, dried at 100° C. and calcined in air at 550° C. for 16 hours. The X-ray diffraction pattern is given in Table 5(b).

EXAMPLE 6

2.1 g of sodium aluminate and 3.6 g of potassium hydroxide were dissolved in 60 g of distilled water. 7.4 g of tetraethylammonium hydroxide solution (40 wt % in water) was added to the solution and stirred for approximately 5 minutes. 25 g of Ludox AS40 was added with stirring in order to ensure that the formed hydrogel was homogenously mixed. The hydrogel had a molar composition of:

$1.2Na_2O:3.8K_2O:2.4TEAOH:1.0Al_2O_3:20.2SiO_2:500H_2O$.

The hydrogel was loaded into approximately 150 cm³ pressure vessel and heated to 180° C. while revolving for 4 days. At the end of this period the pressure vessel was cooled to ambient and the content was filtered. The solid product was washed with distilled water, dried at 100° C. and examined by X-ray powder diffraction. The XRD is given in Table 6. The product was a good sample of SUZ-4.

EXAMPLE 7

In this Example, LHSV=volume of liquid per volume of catalyst per hour; and GHSV=volume of gas per volume of catalyst per hour.

3 g of the product of Example 3(a) was refluxed in 0.5 liter of 10% nitric acid solution for 1 hour. The zeolite was filtered, washed well with distilled water, dried at 100° C. and calcined in air at 550° C. for 16 hours. The zeolite was given two further 1-hour reflux treatments in 0.5 liter 10 wt % nitric acid solution. The zeolite was filtered, washed, dried and calcined in air at 550° C. for 16 hours.

The zeolite powder was pressed into a tablet at 7 tons per square inch of pressure. The tablet was crushed and sieved to pass through 500 micron but not 250 micron sieves. 4.3 cm$^3$ of this catalyst was loaded into a reactor and activated as follows: the temperature of the catalyst was raised by 10° C./minute until it plateaued at 500° C. which was sustained for 3 hours and then the reactor was cooled to 300° C. A flow of hydrogen (75 cm$^3$/minute) was maintained throughout this treatment. The catalyst was tested for the conversion of a feed consisting of a 2:1 (by volume) mixture of hexadecane and dodecene at 300° C., LHSV of 1.5 and pressure of 20 barg. A gas flow consisting of 2:1 hydrogen and carbon monoxide was cofed with liquid feed at GHSV of 1249. After 1 hour on stream the conversion of the dodecene was 100% and the conversion of hexadecane was 19.9 molar %. The carbon molar selectivity to products with carbon number between 5 and 11 was 78.3%.

TABLE A

Reagents and Weights used in Examples

| Reagent | Weight in grams Example | | | | | |
|---|---|---|---|---|---|---|
| | 1 | 2 | 3 | 4 | 5 | 6 |
| Sodium aluminate | 8.0 | 2.0 | 2.0 | 2.0 | 0 | 2.1 |
| Potassium hydroxide | 12.0 | 2.5 | 2.5 | 3.0 | 3.9 | 3.6 |
| Distilled water | 200 | 50 | 50 | 50 | 57.8 | 60 |
| Quinuclidine | 10 | 2.5 | 2.5 | 2.5 | 0 | 0 |
| Tetraethylammonium hydroxide (40% w/w in water) | 30 | 7.5 | 15 | 7.9 | 7.7 | 7.4 |
| Ludox AS40 | 100 | 25 | 25 | 25 | 26 | 25 |
| Methanol | 0 | 0 | 10 | 10 | 0 | 0 |
| Aluminium tri-isopropoxide | 0 | 0 | 0 | 0 | 4.7 | 0 |

TABLE I

Significant Peaks included in the XRD of SUZ-4, calcined, hydrogen Form

| d(Å) | I |
|---|---|
| 11.5 ± 0.25 | VS |
| 7.50 ± 0.15 | M |
| 7.20 ± 0.15 | W |
| 5.88 ± 0.12 | S |
| 5.73 ± 0.12 | M |
| 4.75 ± 0.10 | M |
| 4.58 ± 0.10 | M/S |
| 4.00 ± 0.10 | W |
| 3.95 ± 0.08 | M |
| 3.81 ± 0.08 | M |
| 3.75 ± 0.08 | W |
| 3.67 ± 0.08 | W |
| 3.58 ± 0.08 | S |
| 3.55 ± 0.08 | S |
| 3.49 ± 0.07 | S |
| 3.48 ± 0.07 | M |
| 3.14 ± 0.07 | M |
| 2.97 ± 0.06 | W |
| 2.93 ± 0.06 | M |
| 2.91 ± 0.06 | W |

VS = 60-140
S = 40-60
M = 20-40
W = 0-20

TABLE 1(a)

XRD of product as prepared in Example 1(a)

| 2 theta | d(Å) | I/I$_o$ |
|---|---|---|
| 7.63 | 11.58 | 100 |
| 11.77 | 7.51 | 26 |
| 12.23 | 7.23 | 6 |
| 15.01 | 5.90 | 53 |
| 15.40 | 5.75 | 30 |
| 18.63 | 4.76 | 32 |
| 19.33 | 4.59 | 48 |
| 22.12 | 4.01 | 26 |
| 22.45 | 3.96 | 28 |
| 23.22 | 3.83 | 40 |
| 23.75 | 3.74 | 4 |
| 24.20 | 3.67 | 7 |
| 24.68 | 3.60 | 57 |
| 25.00 | 3.56 | 50 |
| 25.52 | 3.49 | 47 |
| 26.45 | 3.37 | 2 |
| 28.40 | 3.14 | 60 |
| 29.11 | 3.06 | 3 |
| 29.95 | 2.98 | 21 |
| 30.43 | 2.94 | 26 |
| 30.67 | 2.91 | 26 |
| 31.39 | 2.85 | 11 |
| 33.14 | 2.70 | 21 |
| 33.43 | 2.68 | 13 |
| 34.15 | 2.62 | 2 |

TABLE 1(b)

XRD of product, calcined hydrogen form, obtained in Example 1(b)

| 2 theta | d(Å) | I/I$_o$ |
|---|---|---|
| 7.69 | 11.49 | 100 |
| 11.78 | 7.50 | 32 |
| 12.33 | 7.17 | 8 |
| 14.10 | 6.27 | 6 |
| 15.04 | 5.88 | 44 |
| 15.45 | 5.73 | 31 |
| 18.67 | 4.75 | 29 |
| 19.38 | 4.58 | 36 |
| 22.20 | 4.00 | 19 |
| 22.50 | 3.95 | 25 |
| 23.32 | 3.81 | 33 |
| 23.73 | 3.75 | 10 |
| 24.26 | 3.67 | 14 |
| 24.87 | 3.58 | 57 |
| 25.52 | 3.49 | 42 |
| 26.61 | 3.35 | 3 |
| 28.39 | 3.14 | 39 |
| 29.18 | 3.06 | 4 |
| 30.10 | 2.97 | 19 |
| 30.43 | 2.93 | 21 |
| 30.68 | 2.91 | 19 |
| 31.57 | 2.83 | 8 |

TABLE 2

XRD of product obtained in Example 2

| 2 theta | d(Å) | I/I$_o$ |
|---|---|---|
| 6.39 | 13.82 | 19* |
| 7.59 | 11.64 | 82 |
| 8.50 | 10.39 | 4* |
| 9.63 | 9.18 | 37* |
| 11.70 | 7.56 | 32 |
| 12.14 | 7.28 | 6 |
| 13.33 | 6.64 | 31* |
| 13.74 | 6.44 | 7* |
| 14.98 | 5.91 | 89* |
| 15.34 | 5.77 | 37* |
| 19.29 | 4.60 | 83 |
| 19.53 | 4.54 | 36* |
| 21.33 | 4.16 | 5 |
| 22.10 | 4.02 | 71* |
| 22.42 | 3.96 | 44 |
| 23.13 | 3.84 | 56 |
| 23.25 | 3.82 | 41 |
| 23.67 | 3.76 | 14* |

TABLE 2-continued

XRD of product obtained in Example 2

| 2 theta | d(Å) | I/I$_o$ |
|---|---|---|
| 24.18 | 3.68 | 30 |
| 24.63 | 3.61 | 72 |
| 24.96 | 3.56 | 59 |
| 25.52 | 3.49 | 100* |
| 26.16 | 3.40 | 25* |
| 27.47 | 3.24 | 32* |
| 27.78 | 3.21 | 24 |
| 28.31 | 3.15 | 71 |
| 29.00 | 3.08 | 4 |
| 29.97 | 2.98 | 27 |
| 30.37 | 2.94 | 35 |
| 30.84 | 2.90 | 26* |
| 31.33 | 2.85 | 11 |

*Lines partly or wholly due to mordenite

TABLE 3(a)

XRD of product as prepared in Example 3(a)

| 2 theta | d(Å) | I/I$_o$ |
|---|---|---|
| 6.38 | 13.84 | 3* |
| 7.60 | 11.62 | 100 |
| 9.67 | 9.14 | 2* |
| 11.74 | 7.53 | 27 |
| 12.19 | 7.25 | 6 |
| 13.30 | 6.65 | 3* |
| 14.98 | 5.91 | 66 |
| 15.37 | 5.76 | 31 |
| 18.63 | 4.76 | 38 |
| 19.31 | 4.59 | 57* |
| 22.06 | 4.03 | 25* |
| 22.41 | 3.96 | 39 |
| 23.19 | 3.83 | 43 |
| 23.70 | 3.75 | 10 |
| 24.17 | 3.68 | 25 |
| 24.66 | 3.61 | 64 |
| 24.98 | 3.56 | 55 |
| 25.51 | 3.49 | 53* |
| 26.39 | 3.37 | 4 |
| 26.83 | 3.32 | 3 |
| 27.38 | 3.25 | 5* |
| 28.35 | 3.15 | 61 |
| 29.02 | 3.07 | 5 |
| 29.97 | 2.98 | 25 |
| 30.36 | 2.94 | 29 |
| 30.63 | 2.92 | 26 |
| 31.34 | 2.85 | 11 |

*Lines partly or wholly due to mordenite

TABLE 3(b)

XRD of product, calcined, Example 3(b)

| 2 theta | d(Å) | I/I$_o$ |
|---|---|---|
| 7.66 | 11.53 | 100 |
| 9.67 | 9.14 | 1* |
| 11.80 | 7.49 | 36 |
| 12.30 | 7.19 | 7 |
| 13.35 | 6.62 | 2* |
| 14.14 | 6.26 | 5 |
| 15.02 | 5.89 | 43 |
| 15.44 | 5.73 | 33 |
| 18.62 | 4.76 | 33 |
| 19.33 | 4.59 | 36* |
| 22.12 | 4.01 | 23* |
| 22.43 | 3.96 | 24 |
| 23.27 | 3.82 | 38 |
| 23.81 | 3.73 | 10 |
| 24.14 | 3.68 | 14 |
| 24.90 | 3.57 | 59 |
| 25.53 | 3.49 | 49* |
| 27.61 | 3.23 | 5* |
| 28.41 | 3.14 | 45 |
| 29.23 | 3.05 | 5 |
| 30.02 | 2.97 | 22 |
| 30.43 | 2.93 | 25 |
| 30.72 | 2.91 | 22 |

TABLE 3(b)-continued

XRD of product, calcined, Example 3(b)

| 2 theta | d(Å) | I/I$_o$ |
|---|---|---|
| 31.61 | 2.83 | 9 |

*Lines partly or wholly due to mordenite

TABLE 4

XRD of product as prepared in Example 4

| 2 theta | d(Å) | I/I$_o$ |
|---|---|---|
| 6.42 | 13.76 | 41* |
| 7.63 | 11.58 | 59 |
| 8.55 | 10.33 | 7* |
| 9.68 | 9.13 | 53* |
| 11.76 | 7.52 | 15 |
| 12.21 | 7.25 | 4 |
| 13.37 | 6.62 | 37* |
| 13.79 | 6.42 | 9* |
| 14.52 | 6.09 | 8* |
| 15.02 | 5.89 | 43* |
| 15.51 | 5.71 | 20 |
| 17.52 | 5.06 | 1* |
| 18.07 | 4.91 | 3* |
| 18.67 | 4.75 | 23 |
| 19.32 | 4.59 | 47 |
| 19.55 | 4.54 | 42* |
| 21.36 | 4.16 | 7* |
| 22.15 | 4.01 | 71* |
| 22.46 | 3.96 | 25 |
| 23.19 | 3.83 | 33* |
| 23.67 | 3.76 | 9* |
| 24.19 | 3.68 | 12* |
| 24.69 | 3.60 | 38 |
| 25.00 | 3.56 | 33 |
| 25.59 | 3.48 | 100* |
| 26.19 | 3.40 | 32* |
| 27.54 | 3.24 | 39* |
| 27.82 | 3.20 | 26 |
| 28.35 | 3.15 | 38 |
| 29.99 | 2.98 | 14 |
| 30.34 | 2.94 | 17* |
| 30.86 | 2.90 | 23* |
| 31.39 | 2.85 | 6 |

*Lines partly or wholly due to mordenite

TABLE 5(a)

XRD of product as prepared in Example 5(a)

| 2 theta | d(Å) | I/I$_o$ |
|---|---|---|
| 7.69 | 11.48 | 100 |
| 11.86 | 7.46 | 35 |
| 12.29 | 7.20 | 7 |
| 15.09 | 5.87 | 54 |
| 15.45 | 5.73 | 30 |
| 18.70 | 4.74 | 32 |
| 19.40 | 4.57 | 49 |
| 22.22 | 4.00 | 19 |
| 22.52 | 3.95 | 31 |
| 23.30 | 3.81 | 37 |
| 23.83 | 3.73 | 9 |
| 24.26 | 3.67 | 18 |
| 24.80 | 3.59 | 44 |
| 25.07 | 3.55 | 53 |
| 25.63 | 3.47 | 47 |
| 28.46 | 3.13 | 58 |
| 29.14 | 3.06 | 5 |
| 30.05 | 2.97 | 19 |
| 30.47 | 2.93 | 25 |
| 30.72 | 2.91 | 23 |
| 31.50 | 2.84 | 11 |

TABLE 5(b)

XRD of product as prepared in Example 5(b)

| 2 theta | d(Å) | I/I$_o$ |
|---|---|---|
| 7.73 | 11.43 | 100 |
| 11.83 | 7.47 | 39 |

TABLE 5(b)-continued

XRD of product as prepared in Example 5(b)

| 2 theta | d(Å) | I/I$_o$ |
|---|---|---|
| 12.33 | 7.17 | 9 |
| 14.13 | 6.26 | 7 |
| 15.09 | 5.87 | 49 |
| 15.47 | 5.72 | 34 |
| 18.75 | 4.73 | 29 |
| 19.42 | 4.57 | 41 |
| 22.26 | 3.99 | 18 |
| 22.54 | 3.94 | 27 |
| 23.36 | 3.81 | 32 |
| 23.78 | 3.74 | 10 |
| 24.33 | 3.66 | 13 |
| 24.88 | 3.58 | 49 |
| 24.98 | 3.56 | 48 |
| 25.68 | 3.48 | 44 |
| 26.64 | 3.34 | 3 |
| 27.57 | 3.23 | 3 |
| 28.43 | 3.14 | 39 |
| 29.24 | 3.05 | 3 |
| 30.14 | 2.96 | 16 |
| 30.49 | 2.93 | 18 |
| 30.74 | 2.91 | 18 |
| 31.57 | 2.83 | 7 |

TABLE 6

XRD of product as prepared in Example 6

| 2 theta | d(Å) | I/I$_o$ |
|---|---|---|
| 7.69 | 11.50 | 100 |
| 11.83 | 7.47 | 24 |
| 12.29 | 7.20 | 6 |
| 15.07 | 5.87 | 50 |
| 15.44 | 5.73 | 29 |
| 18.67 | 4.75 | 31 |
| 19.39 | 4.57 | 42 |
| 22.19 | 4.00 | 19 |
| 22.47 | 3.95 | 30 |
| 23.28 | 3.82 | 37 |
| 23.82 | 3.73 | 7 |
| 24.21 | 3.67 | 16 |
| 24.80 | 3.59 | 43 |
| 25.07 | 3.55 | 47 |
| 25.50 | 3.49 | 35 |
| 25.61 | 3.48 | 44 |
| 26.51 | 3.36 | 3 |
| 26.94 | 3.31 | 3 |
| 27.53 | 3.24 | 3 |
| 28.45 | 3.13 | 54 |
| 29.12 | 3.06 | 4 |
| 30.02 | 2.97 | 20 |
| 30.48 | 2.93 | 21 |
| 30.72 | 2.90 | 21 |
| 31.50 | 2.84 | 10 |

I claim:

1. A crystalline material having, in the dehydrated form, the empirical formula:

$$m(M_{2/a}O):X_2O_{xz/2}:yYO_2 \qquad (I)$$

in which m is 0.5 to 1.5; M is a cation of valency a; X is a metal of valency x, selected from the group consisting of aluminum, boron, gallium, zinc, iron and titanium; z is 2 when x is an odd number, and z is 1 when x is an even number; y is at least 5; and Y is silicon or germanium; and having, in the calcined hydrogen form, an X-ray diffraction pattern including significant peaks substantially as follows:

| d(Å) | I |
|---|---|
| 11.5 ± 0.25 | VS |
| 7.50 ± 0.15 | M |
| 7.20 ± 0.15 | W |
| 5.88 ± 0.12 | S |
| 5.73 ± 0.12 | M |
| 4.75 ± 0.10 | M |
| 4.58 ± 0.10 | M/S |
| 4.00 ± 0.10 | W |
| 3.95 ± 0.08 | M |
| 3.81 ± 0.08 | M |
| 3.75 ± 0.08 | W |
| 3.67 ± 0.08 | W |
| 3.58 ± 0.08 | S |
| 3.55 ± 0.08 | S |
| 3.49 ± 0.07 | S |
| 3.48 ± 0.07 | M |
| 3.14 ± 0.07 | M |
| 2.97 ± 0.06 | W |
| 2.93 ± 0.06 | M |
| 2.91 ± 0.06 | W | wherein VS=60–140, S=40–60, M=20–40 and W=0–20.

2. A material as claimed in claim 1, in which X is aluminium.

3. A material as claimed in claim 1, in which Y is silicon.

4. A material as claimed in claim 1, in the calcined hydrogen form.

5. A process for the preparation of a material which comprises reacting together under aqueous alkaline conditions a source of oxide YO$_2$; water; and tetraethylammonium hydroxide or halide or its precursor or reaction product; optionally a source of oxide X$_2$O$_{xz/2}$ and a source of M(OH)$_a$; the resultant mixture having components in the following molar ratios: YO$_2$/X$_2$O$_{xz/2}$=at least 5; H$_2$O/YO$_2$=4 to 500; OH$^-$/H$_2$O=less than 0.04; tetraethylammonium compound/YO$_2$=0.005 to 2.0; the reaction conditions being selected and maintained such as to produce a crystalline material having, in the dehydrated form, the empirical formula:

$$m(M_{2/a}O):X_2O_{xz/2}:yYO_2 \qquad (I)$$

in which m is 0.5 to 1.5; M is a cation of valency a; X is a metal of valency x, selected from the group consisting of aluminum, boron, gallium, zinc, iron and titanium; z is 2 when x is an odd number, and z is 1 when x is an even number; y is at least 5; and Y is silicon or germanium; and having, in the calcined hydrogen form, an X-ray diffraction pattern as follows:

| d(Å) | I |
|---|---|
| 11.5 ± 0.25 | VS |
| 7.50 ± 0.15 | M |
| 7.20 ± 0.15 | W |
| 5.88 ± 0.12 | S |
| 5.73 ± 0.12 | M |
| 4.75 ± 0.10 | M |
| 4.58 ± 0.10 | M/S |
| 4.00 ± 0.10 | W |
| 3.95 ± 0.08 | M |
| 3.81 ± 0.08 | M |
| 3.75 ± 0.08 | W |
| 3.67 ± 0.08 | W |
| 3.58 ± 0.08 | S |
| 3.55 ± 0.08 | S |
| 3.49 ± 0.07 | S |
| 3.48 ± 0.07 | M |
| 3.14 ± 0.07 | M |
| 2.97 ± 0.06 | W |
| 2.93 ± 0.06 | M |

| d(A) | I |
|---|---|
| 2.91 ± 0.06 | w | wherein VS=60-140, S=40-60, M=20-40 and W=0-20.

6. A process as claimed in claim 5, in which the reaction mixture has components in the following molar ratios:

$YO_2/X_zO_{xz/2}$ = 5 to 80; $H_2O/YO_2$ = 5 to 200; $OH^-/H_2O$ = less than 0.02; tetraethylammonium compound/$YO_2$ = 0.01 to 1.0.

7. A process as claimed in claim 6, in which the reaction mixture has components in the following molar ratios:

$YO_2/X_zO_{xz/2}$ = 10 to 30; $H_2O/YO_2$ = 7 to 100; $OH^-/H_2O$ = $10^{-4}$ to 0.02; tetraethylammonium compound/$YO_2$ = 0.02 to 0.5.

8. A process as claimed in claim 5, in which the reaction mixture also includes methanol.

9. A process for the conversion of a hydrocarbon or oxygenate into other products, which comprises passing the feedstock over a material as claimed in claim 1.

10. A material as claimed in claim 2, in the calcined hydrogen form.

11. A material as claimed in claim 3, in the calcined hydrogen form.

12. A material as claimed in claim 2, in which Y is silicon.

13. A process as claimed in claim 6, which the reaction mixture also includes methanol.

14. A process as claimed in claim 7, in which the reaction mixture also includes methanol.

15. A process for the conversion of a hydrocarbon or oxygenate into other products, which comprises passing the feedstock over material as claimed in claim 2.

16. A process for the conversion of hydrocarbon or oxygenate into other products, which comprises passing the feedstock over material as claimed in claim 3.

17. A process for the conversion of hydrocarbon or oxygenate into other products, which comprises passing the feedstock over a material as claimed in claim 4.

18. A material as claimed in claim 12 in which Y is silicon.

19. A material as claimed in claim 10, in the calcined hydrogen form.

20. A material as claimed in claim 11, in the calcined hydrogen form.

* * * * *